US011578001B2

(12) United States Patent
Kodama (10) Patent No.: US 11,578,001 B2
(45) Date of Patent: Feb. 14, 2023

(54) COATING MATERIAL, OUTER PERIPHERY-COATED SILICON CARBIDE-BASED HONEYCOMB STRUCTURE, AND METHOD FOR COATING OUTER PERIPHERY OF SILICON CARBIDE-BASED HONEYCOMB STRUCTURE

(71) Applicant: NGK INSULATORS, LTD., Nagoya (JP)

(72) Inventor: Suguru Kodama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 63 days.

(21) Appl. No.: 16/363,155

(22) Filed: Mar. 25, 2019

(65) Prior Publication Data

US 2019/0300440 A1     Oct. 3, 2019

(30) Foreign Application Priority Data

Mar. 30, 2018   (JP) .............................. JP2018-070013

(51) Int. Cl.
| | | |
|---|---|---|
| C04B 35/117 | (2006.01) | |
| C04B 35/565 | (2006.01) | |
| C04B 35/622 | (2006.01) | |
| C04B 35/18  | (2006.01) | |
| C04B 35/195 | (2006.01) | |
| C04B 35/80  | (2006.01) | |

(52) U.S. Cl.
CPC ............ *C04B 35/117* (2013.01); *C04B 35/18* (2013.01); *C04B 35/195* (2013.01); *C04B 35/565* (2013.01); *C04B 35/62222* (2013.01); *C04B 35/80* (2013.01); *C04B 2235/3418* (2013.01); *C04B 2235/5436* (2013.01); *C04B 2235/9661* (2013.01)

(58) Field of Classification Search
CPC ............ C04B 35/565; C04B 35/62222; C04B 2235/3418; C04B 2235/5436; C04B 2235/9661
See application file for complete search history.

(56) References Cited

U.S. PATENT DOCUMENTS

| 5,188,779 A | 2/1993 | Horikawa et al. |
| 7,964,263 B2 * | 6/2011 | Kodama ............... F01N 3/0222 |
| | | 428/116 |

(Continued)

FOREIGN PATENT DOCUMENTS

| JP | S6151240 B2 * | 11/1986 | ........... F28D 19/042 |
| JP | H05-269388 A1 | 10/1993 | |

(Continued)

OTHER PUBLICATIONS

Japanese Office Action (with English translation), Japanese Application No. 2018-070013, dated Mar. 30, 2021 (6 pages).
Japanese Office Action (with English translation), Japanese Application No. 2018-070013, dated Sep. 29, 2020 (9 pages).

(Continued)

*Primary Examiner* — Colin W. Slifka
*Assistant Examiner* — Michael Forrest
(74) *Attorney, Agent, or Firm* — Burr Patent Law, PLLC (57) ABSTRACT

A coating material for a silicon carbide-based honeycomb structure, the coating material including from 20 to 75% by mass of ceramic powder (A), the ceramic powder (A) including from 55 to 95% by mass of silicon carbide and from 5 to 30% by mass of silicon dioxide as chemical components.

9 Claims, 1 Drawing Sheet

(56) References Cited

U.S. PATENT DOCUMENTS

| | | | |
|---|---|---|---|
| 2008/0084010 A1 | 4/2008 | Naruse et al. | |
| 2009/0022944 A1* | 1/2009 | Watanabe | B01D 46/2429 |
| | | | 428/116 |
| 2010/0112280 A1* | 5/2010 | Iwamoto | C09D 7/70 |
| | | | 428/116 |
| 2010/0119719 A1 | 5/2010 | Kono et al. | |
| 2011/0224071 A1* | 9/2011 | Okumura | C04B 41/85 |
| | | | 502/439 |
| 2012/0009092 A1 | 1/2012 | Mizutani et al. | |
| 2012/0225768 A1* | 9/2012 | Kono | C04B 41/009 |
| | | | 501/1 |
| 2013/0269303 A1* | 10/2013 | Uoe | C04B 38/0006 |
| | | | 55/523 |
| 2013/0316130 A1* | 11/2013 | Takahashi | C04B 35/573 |
| | | | 428/116 |

FOREIGN PATENT DOCUMENTS

| | | | |
|---|---|---|---|
| JP | 2604876 B2 | | 4/1997 |
| JP | 2008-069069 A | | 3/2008 |
| JP | 2010001204 A | * | 1/2010 |
| JP | 2010-132538 A | | 6/2010 |
| JP | 2011-206764 A | | 10/2011 |
| JP | WO 2010/110010 A1 | | 9/2012 |
| JP | 5345502 B2 | | 11/2013 |
| JP | 2018-034112 A | | 3/2018 |
| WO | 2009/014200 A1 | | 1/2009 |

OTHER PUBLICATIONS

Chinese Office Action (with English translation) dated Apr. 26, 2022 (Application No. 201910235804.2).

* cited by examiner

COATING MATERIAL, OUTER PERIPHERY-COATED SILICON CARBIDE-BASED HONEYCOMB STRUCTURE, AND METHOD FOR COATING OUTER PERIPHERY OF SILICON CARBIDE-BASED HONEYCOMB STRUCTURE

TECHNICAL FIELD

The present invention relates to a coating material, an outer periphery-coated silicon carbide-based honeycomb structure, and a method for coating an outer periphery of a silicon carbide-based honeycomb structure. More particularly, it relates to a coating material, an outer periphery-coated silicon carbide-based honeycomb structure, and a method for coating an outer periphery of a silicon carbide-based honeycomb structure, which can effectively suppress cracking in an outer periphery-coated layer during drying and a heat treatment.

BACKGROUND ART

As a product supporting a catalyst for cleaning harmful substances such as nitrogen oxide (NOx) and carbon monoxide (CO) in an exhaust gas of motor vehicles or as a filter for collecting fine particles in the exhaust gas, a honeycomb structure made of heat-resistant ceramics is used. The ceramic honeycomb structure has thinner partition walls and lower mechanical strength because of higher porosity. Therefore, for the purposes of compensating for the strength and preventing breakage, a slurry (hereinafter referred to as a coating material) containing ceramic powder is applied on an outer periphery of a honeycomb structure (cell structure) which has been ground to have a constant diameter, dried, and fired to provide an outer wall (see, for example, Patent Documents 1 and 2).

When the coating material is applied to the outer periphery of the honeycomb structure and dried, cracks may be generated due to a difference in shrinkage between a surface of the coating material and the inside. The cracks in the outer wall cause a decrease in the strength of the ceramic honeycomb structure, and when a catalyst is supported on the outer wall, a catalyst liquid may be leaked from the cracks. Therefore, in a step of drying the coating material, in general, the generation of cracks in the coating material is monitored and a correction work (re-painting) is manually carried out.

To address this problem, Patent Document 3 discloses that sink marks (a phenomenon in which a substrate is exposed in a streaky or small hole shape in a coating material) and coating failure are suppressed in the production steps by employing a coating material for a honeycomb structure, in which D90/D10 of inorganic particles contained in the coating material is from 5 to 50, D10 is 50 µm or less, and D90 is 4 µm or more.

Further, Patent Document 4 discloses that drying cracks in a drying step are suppressed such as by using a ceramic powder aggregate having an average particle diameter of from 23 to 39 µm and a particle size distribution width of from 15 to 33.

CITATION LIST

Patent Literatures

Patent Document 1: Japanese Patent Application Publication No. H05-269388 A

Patent Document 2: Japanese Patent No. 2604876 B
Patent Document 3: WO 2009/014200 A1
Patent Document 4: Japanese Patent No. 5345502 B

SUMMARY OF INVENTION

Technical Problem

However, the means disclosed in Patent Document 3 has a problem of a higher cost because a larger amount (30% by mass) of RCF (Refractory Ceramic Fiber) is used as the coating material, so that it is not suitable for mass production. Further, a difference in thermal expansion coefficient between such a coating material and the honeycomb structure is larger (according to the calculation, the thermal expansion coefficient of the honeycomb structure is 4.6 ppm/K, and the thermal expansion coefficient of the coating material is 3.2 ppm/K), so that there is concern about thermal shock resistance.

In the means disclosed in Patent Document 4, the drying temperature is 100° C. However, at this temperature, the colloidal silica used as the inorganic adhesive is in a state of allowing reversible water adsorption and desorption, so that there is concern in terms of water resistance and chemical resistance. Further, since the coating material does not contain color developing components (SiC, $TiO_2$, or the like) by laser, there is a problem that printing by laser marking which has good resistance to a chemical treatment and a heat treatment cannot be performed.

The present invention has been made in view of the above problems. An object of the present invention is to provide a coating material that effectively suppresses the generation of cracks in an outer peripheral coating layer during drying and a heat treatment; an outer periphery-coated silicon carbide-based honeycomb structure; and a method for coating the outer periphery of the silicon carbide-based honeycomb structure.

Solution to Problem

As a result of intensive studies, the present inventors have found that the above problems can be solved by using a coating material having a specific composition as a coating material for a silicon carbide-based honeycomb structure. Thus, the present invention is specified as follows:

(1)
A coating material for a silicon carbide-based honeycomb structure, the coating material comprising from 20 to 75% by mass of ceramic powder (A), the ceramic powder (A) comprising from 55 to 95% by mass of silicon carbide and from 5 to 30% by mass of silicon dioxide as chemical components.

(2)
The coating material according to (1), wherein the ceramic powder (A) has a D50 on volume basis of from 8 to 30 µm, based on a particle size distribution measurement by a laser diffraction/scattering method.

(3)
The coating material according to (1) or (2), wherein the ceramic powder (A) has a D10 on volume basis of from 1 to 4 µm, and D90 of from 20 to 75 µm (D90>D50), based on a particle size distribution measurement by a laser diffraction/scattering method.

(4)
The coating material according to any one of (1) to (3), wherein the ceramic powder (A) is grinding scrap or crushed powder of the silicon carbide-based honeycomb structure.

(5)

The coating material according to any one of (1) to (4), further comprising from 20 to 50% by mass of white or light colored ceramic powder (B).

(6)

The coating material according to (5), wherein the ceramic powder (B) comprises at least one selected from the group consisting of cordierite, silicon nitride, alumina, mullite, zirconia, zirconium phosphate, titania and aluminum titanate.

(7)

The coating material according to (5) or (6), wherein the ceramic powder (B) has a D50 on volume basis of from 1 to 40 μm, based on a particle size distribution measurement by a laser diffraction/scattering method.

(8)

The coating material according to any one of (1) to (7), wherein a ratio of a thermal expansion coefficient after drying the coating material at 600° C. for 30 minutes to a thermal expansion coefficient of the silicon carbide honeycomb structure is from 0.8 to 1.1.

(9)

The coating material according to any one of (1) to (8), wherein the coating material further comprises from 0.1 to 4% of hollow particles containing an organic substance, and wherein the hollow particles have a D50 on volume basis of from 35 to 55 μm, based on a particle size distribution measurement by a laser diffraction/scattering method.

(10)

An outer periphery-coated silicon carbide-based honeycomb structure, comprising: a silicon carbide-based honeycomb structure; and an outer periphery-coated layer covering an outer periphery of the silicon carbide-based honeycomb structure, wherein the outer periphery-coated layer comprises from 20 to 75% by mass of ceramic powder (A), the ceramic powder (A) comprising from 55 to 95% by mass of silicon carbide and from 5 to 30% by mass of silicon dioxide as chemical components.

(11)

The outer periphery-coated silicon carbide-based honeycomb structure according to (10), wherein the ceramic powder (A) has the same composition as that of the silicon carbide-based honeycomb structure.

(12)

The outer periphery-coated silicon carbide-based honeycomb structure according to (10) or (11), wherein a ratio of a thermal expansion coefficient of the outer periphery-coated layer to a thermal expansion coefficient of the silicon carbide-based honeycomb structure is from 0.8 to 1.1.

(13)

A method for coating an outer periphery of a silicon carbide-based honeycomb structure, the method comprising: applying the coating material according to any one of (1) to (9) onto an outer periphery of the silicon carbide-based honeycomb structure and drying the applied coating material to form an outer peripheral coated layer.

Advantageous Effects of Invention

According to the present invention, the generation of cracks in the outer peripheral coated layer during drying/heat treatment can be effectively suppressed.

DESCRIPTION OF THE PREFERRED EMBODIMENTS

Hereinafter, embodiments of a coating material, an outer periphery-coated silicon carbide-based honeycomb structure, and a method for coating an outer periphery of the silicon carbide-based honeycomb structure according to the present invention will be described with reference to the drawing. However, the present invention is not limited to these embodiments, and various changes, modifications, and improvements may be made based on knowledge of those skilled in the art, without departing from the scope of the present invention.

(1. Silicon Carbide-Based Honeycomb Structure)

Figure 1:
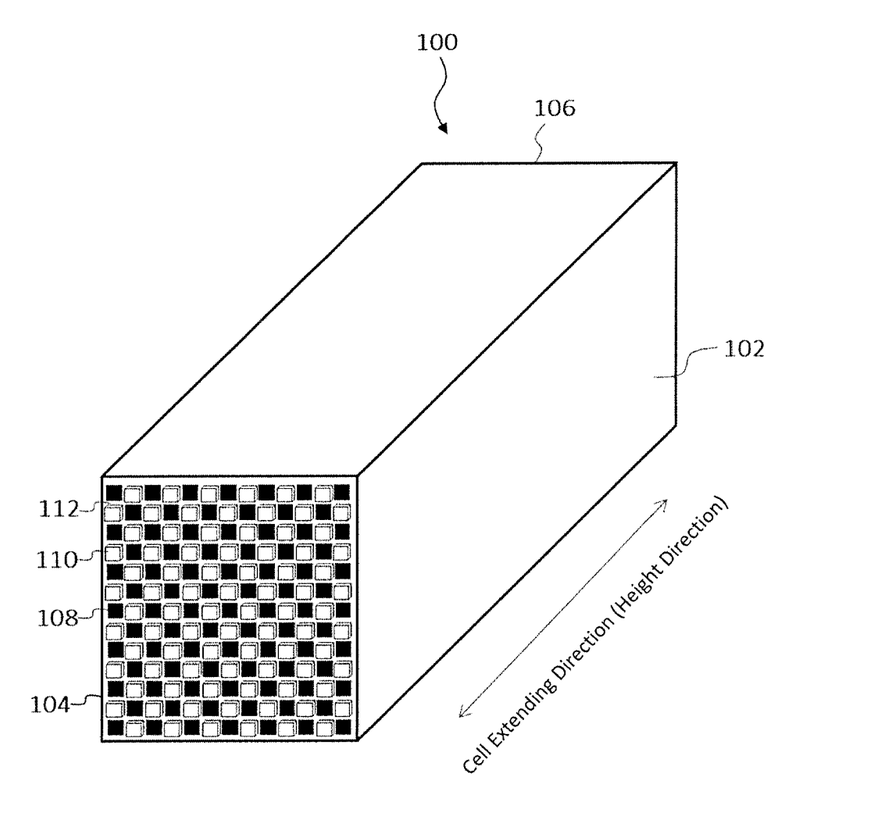
FIG. 1 is a view showing an example of a honeycomb structure according to the present invention.

FIG. 1 shows a perspective view schematically illustrating a honeycomb structure according to one embodiment of the present invention. A honeycomb structure 100 illustrated includes: an outer peripheral side wall 102; a plurality of first cells 108 disposed inside the outer peripheral side wall 102, the first cells extending in parallel from a first end face 104 to a second end face 106, the first cells having plugged portions where the first end face 104 is opened to protrude to the second end face 106; and a plurality of second cells 110 disposed inside the outer peripheral side wall 102, the second cells extending in parallel from the first end face 104 to the second end face 106, the second cells having plugged portions protruding to the first end face 104, and the second end face 106 being opened. Further, in the illustrated honeycomb structure 100, porous partition walls 112 for defining the first cells 108 and the second cells 110 are provided, and each first cell 108 and each second cell 110 are alternately arranged across each partition wall 112, and each of the end faces form a checkered pattern. In the honeycomb structure according to the illustrated embodiment, all the first cells 108 are adjacent to the second cells 110, and all the second cells 110 are adjacent to the first cells 108. However, all of the first cells 108 may not be necessarily adjacent to the second cells 110, and all of the second cells 110 may not be necessarily adjacent to the first cells 108. The number, arrangement, shape and the like of the cells 108 and 110, as well as the thickness of the partition wall 112, and the like, are not limited, and may be appropriately designed as needed.

Although a material of the honeycomb structure is not particularly limited, the honeycomb structure is required to be a porous body having a large number of pores. Therefore, it is usually preferable to use a sintered body of ceramics comprised of silicon carbide, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 100 contains silicon carbide in an amount of 50% by mass or more of the entire honeycomb structure. The phrase "the honeycomb structure 100 is mainly based on a silicon-silicon carbide composite material" means that the honeycomb structure 100 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are preferably bonded by silicon so as to form pores between the silicon carbide particles. The phrase "the honeycomb structure 100 is mainly based on silicon carbide"

means that the honeycomb structure 100 contains 90% by mass or more of silicon carbide (total mass) based on the entire honeycomb structure.

The cell shape of the honeycomb structure may be, but not particularly limited to, a polygonal shape such as a triangle, a quadrangle, a pentagon, a hexagon and an octagon; a circular shape; or an ellipse shape, in a cross section orthogonal to the central axis.

Further, the outer shape of the honeycomb structure may be, but not particularly limited to, a shape such as a pillar shape with circular bottoms (cylindrical shape), a pillar shape with oval shaped bottoms, and a pillar shape with polygonal (square, pentagonal, hexagonal, heptagonal, octagonal, and the like) bottoms, and the like. Furthermore, the size of the honeycomb structure is not particularly limited, and an axial length of the honeycomb structure is preferably from 40 to 500 mm. Further, for example, when the outer shape of the honeycomb structure is cylindrical, a radius of each end face is preferably from 50 to 500 mm.

The thickness of the partition wall of the honeycomb structure is preferably from 0.20 to 0.50 mm, and more preferably from 0.25 to 0.45 mm, in terms of ease of production. For example, if the thickness is less than 0.20 mm, the strength of the outer periphery-coated honeycomb structure may be decreased. If it is more than 0.50 mm, a pressure loss may be increased when the outer periphery-coated honeycomb structure is used as a filter. The thickness of the partition wall is an average value measured by a method for observing the axial cross section with a microscope.

Further, the porosity of the partition walls forming the honeycomb structure is preferably from 30 to 70%, and more preferably from 40 to 65%, in terms of ease of production. If it is less than 30%, a pressure loss may be increased, and if it is more than 70%, the honeycomb structure may become fragile and liable to be lost.

An average pore size of the porous partition walls is preferably from 5 to 30 µm, and more preferably from 10 to 25 µm. If it is less than 5 µm, the pressure loss may be increased even if deposition of particulate matters is less when it is used as a filter, and if it is more than 30 µm, the honeycomb structure may become brittle and liable to be lost. As used herein, the terms "average pore diameter" and "porosity" mean an average pore diameter and a porosity measured by mercury porosimetry, respectively.

A cell density of the honeycomb structure is also not particularly limited, but it is preferably in a range of from 5 to 63 cells/cm$^2$, and more preferably in a range of from 31 to 54 cells/cm$^2$.

Such a honeycomb structure is produced by forming a green body containing a ceramic raw material into a honeycomb shape having partition walls that penetrate from one end face to other end face and define a plurality of cells to form flow paths for a fluid, to form a honeycomb formed body, and drying the honeycomb formed body and then firing it. When such a honeycomb structure is used for the outer periphery-coated honeycomb structure according to the present embodiment, an outer periphery of the honeycomb formed body (honeycomb structure) is ground and shaped into a predetermined shape after forming or firing it, and the above coating material is applied to the outer periphery-ground honeycomb structure to form an outer periphery-coated layer. In the outer periphery-coated honeycomb structure of this embodiment, for example, a honeycomb structure having an outer periphery without grinding the outer periphery of the honeycomb structure may be used, and the coating material may be further applied onto the outer peripheral surface of the honeycomb structure having the outer periphery (that is, a further outer side of the outer periphery of the honeycomb structure) to form the outer periphery-coated layer. That is, in the former case, only the outer periphery-coated layer made of the coating material according to the present embodiment is disposed on the outer peripheral surface of the outer periphery-coated honeycomb structure, whereas in the latter case, an outer peripheral wall having a two-layered structure is formed in which the outer periphery-coated layer made of the coating material according to the present embodiment is further laminated on the outer peripheral surface of the honeycomb structure.

The honeycomb structure is not limited to an integral type honeycomb structure in which the partition walls are integrally formed. For example, although not shown in the drawing, the honeycomb structure may be a honeycomb structure in which pillar shaped honeycomb segments each having a plurality of cells defied by porous partition walls to form flow paths for a fluid are combined via joining material layers (which, hereinafter, may be referred to as a "joined honeycomb structure").

Further, the honeycomb structure may be a honeycomb structure in which one open end of a predetermined cell among the plurality of cells and other open end of the remaining cell are plugged by plugged portions. Such a honeycomb structure can be used as a filter (honeycomb filter) for purifying an exhaust gas. It should be noted that such plugged portions may be arranged after the outer periphery-coated layer is formed or in a state before the outer peripheral coating layer is formed, i.e., in a stage of producing the honeycomb structure.

The plugged portions that can be used may be formed similarly to those used as plugged portions for a conventionally known honeycomb structure.

Further, the honeycomb structure used for the outer periphery-coated honeycomb structure according to the present embodiment may have a catalyst supported on at least one of the surfaces of the partition walls and the inside of the pores of the partition walls. Thus, the outer periphery-coated honeycomb structure according to the present embodiment may be structured as a catalyst body in which a catalyst is supported, and a catalyst supported filter (for example, a diesel particulate filter (hereinafter also referred to as "DPF") in which a catalyst for purifying an exhaust gas is supported.

The type of the catalyst is not particularly limited, and it may be selected as needed depending on the purpose of use and applications of the outer periphery-coated honeycomb structure. For example, when used as the DPF, examples of the catalyst include an oxidation catalyst for oxidizing and removing soot and the like in the exhaust gas; a NOx selective reduction catalyst (SCR) and a NOx storage reduction catalyst for removing harmful components such as NOx contained in the exhaust gas; and the like. A method for supporting the catalyst is also not particularly limited, and it may be carried out according to the conventional supporting method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, a honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall.

The material of the joining material adhesion preventing mask that can be suitably used includes, but not particularly limited to, synthetic resins such as polypropylene (PP), polyethylene terephthalate (PET), polyimide, Teflon® and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include an adhesive film having a thickness of from 20 to 50 µm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirin, corundum, and titania, and more preferably having the same material as that of the honeycomb structure. The binder includes polyvinyl alcohol, methyl cellulose, CMC (carboxymethyl cellulose) and the like.

(2. Coating Material)

The coating material according to the embodiment contains from 20 to 75% by mass of ceramic powder (A) that contains from 55 to 95% by mass of silicon carbide and from 5 to 30% by mass of silicon dioxide as chemical components. As used herein, the expression "as chemical components" means that it may have a chemical composition of silicon carbide or silicon dioxide, regardless of any form such as a crystalline form, an amorphous form or the like.

Such a coating material of this embodiment can effectively suppress the generation of cracks when it is applied to the outer peripheral surface of the honeycomb structure, and dried or dried and then fired to form the outer peripheral coated layer. That is, the coating material having the above composition has a thermal expansion coefficient close to a thermal expansion coefficient of the dried honeycomb structure, so that the thermal shock resistance is higher as a whole and cracks are hardly generated.

From this viewpoint, a ratio of the thermal expansion coefficient after drying the coating material at 600° C. for 30 minutes to the thermal expansion coefficient of the silicon carbide honeycomb structure is preferably from 0.8 to 1.1. The ratio of the thermal expansion coefficient within the above range can allow the generation of cracks to be suppressed more effectively.

Further, a D50 on volume basis of the ceramic powder (A) is preferably from 8 to 30 µm, based on a particle size distribution measurement by the laser diffraction/scattering method. The D50 of the ceramic powder (A) within the above range can provide a coating material having appropriate fluidity, and can improve the uniformity when the coating material is applied, so that the generation of cracks can be more effectively suppressed.

Further, it is preferable that a D10 on volume basis of the ceramic powder (A) is from 1 to 4 µm and the D90 is 20 to 75 µm (D90>D50), based on the particle size distribution measurement by the laser diffraction/scattering method. The D10 and D90 of the ceramic powder (A) in the above ranges increase a packing density of aggregate powder in the coating material and reduce an amount of shrinkage when the coating material is dried, so that the generation of cracks can be more effectively suppressed.

Further, it is preferable that the ceramic powder (A) has the same composition as that of the silicon carbide-based honeycomb structure to be coated. If they have the same composition, the thermal expansion coefficients are also the same, so that the effect of suppressing cracks is more remarkably produced. As used herein, "the same composition" means the same chemical composition, regardless of the existence form of each chemical component.

Further, it is more preferable that the ceramic powder (A) is grinding scraps or crushed wastes generated in the process of producing the silicon carbide-based honeycomb structure. This can ensure that the ceramic powder (A) has the same composition as that of the silicon carbide-based honeycomb structure, and provide an effect of cost reduction in that the grinding scraps or crushed wastes can be effectively utilized. The grinding scraps are scraps generated when grinding the honeycomb structure to have a predetermined shape, and the crushed wastes are wastes generated by pulverizing a defective product of the honeycomb structure or the like in order to recuse the defective product as a raw material.

Further, it is preferable that the coating material further contains from 20 to 50% by mass of white or light colored ceramic powder (B). That is, when the coating material contains from 20 to 75% by mass of the ceramic powder (A), the coating material itself often presents a color close to black, and even if coloring (marking) is performed by the laser, the contrast to a portion where the coloring is not performed may be insufficient and visibility may be lower. Therefore, it may be difficult to read out printing (marking). So, it is preferable that by containing 20% by mass of the white or light colored ceramic powder (B), the color of the entire coating material is rendered light to enhance the contrast between a position colored by the laser and a non-colored position. On the other hand, if the ceramic powder (B) is more than 50% by mass, a variation in the thermal expansion coefficient of the coating material will be increased. Therefore, the upper limit of the ceramic powder (B) is preferably 50% by mass.

The type of the ceramic powder (B) is not limited, but cordierite and alumina can be suitably used.

Further, as used herein, the "printing" by a laser is not limited to printing by letters, and refers to an indication of a mark such as figures, symbols, patterns and identification information such as barcodes.

It is preferable that the coating material contains from 0.1 to 4% by mass of hollow particles containing an organic substance and the hollow particles have a D50 on volume basis of from 35 to 55 µm, based on the particle size distribution measurement by the laser diffraction/scattering method. The addition of such bulky coarse hollow particles can allow suppression of drying shrinkage and further suppression of sink marks and cracks. If the hollow particles are more than 4% by mass, a variation in the thermal expansion coefficient of the coating material will be increased. Therefore, the upper limit of the hollow particles is preferably 4% by mass.

Examples of the hollow particles that can be used include, but not limited to, foamed resins and fly ash balloons.

The coating material according to the present embodiment is formed as a slurry state in which the ceramic powder (A), the ceramic powder (B) and the hollow particles are dispersed by a dispersion medium.

The dispersion medium used in the coating material according to the present embodiment may be any liquid capable of dispersing the ceramic powder (A), the ceramic powder (B) and the hollow particles as described above, and water may be suitably used.

An amount of the dispersion medium is not particularly limited, but when the coating material is applied to the outer peripheral surface of the honeycomb structure (support) to form the outer periphery-coated layer, the amount is prepared so as to have sufficient coatability and viscosity. Specifically, it is preferably from 15 to 30% by mass, and more preferably from 20 to 25% by mass.

Further, the coating material according to the present embodiment may further contain colloidal silica as an inorganic binder. Such colloidal silica functions as an adhesive for the coating material, and can provide improved adhesiveness to the honeycomb structure when the outer periphery-coated layer is formed on the outer periphery of the honeycomb structure by the coating material.

In addition, the content of colloidal silica is preferably from 20 to 35% by mass, and more preferably from 25 to 30% by mass. This can allow improvement of the coatability and viscosity when applying the coating material, and allow reliable adhesion such that the formed outer periphery-coated layer does not peel from the honeycomb structure due to impact or the like.

The colloidal silica preferably has, for example, an average particle diameter of the dispersed silica particles of from 10 to 30 nm, and more preferably from 15 to 25 nm.

Furthermore, the coating material according to the present embodiment may further contain an organic binder, clay and the like. Examples of the organic binder include methyl cellulose (hereinafter also referred to as "MC"), carboxymethyl cellulose (hereinafter also referred to as "CMC"), and biopolymers. Examples of the clay include bentonite and montmorillonite. However, as mentioned above, it is desirable to suppress the use of RCF from the viewpoint of cost.

The coating material according to this embodiment can be produced by mixing the colloidal silica and other additives together with the dispersion medium to prepare a slurry or a paste.

Further, the coating material is preferably prepared to have a viscosity of from 100 to 300 dPa·s, and more preferably from 150 to 250 dPa·s, and even more preferably from 180 to 220 dPa·s. This can lead to easy application to the outer peripheral surface of the honeycomb structure. For example, if the viscosity is less than 100 dPa·s, the flowability of the coating material is too high, so that when the coating material is applied, the coating material may flow out and it may be difficult to form an outer periphery-coated layer having a sufficient thickness. In particular, a thinner outer periphery-coated layer may result in less color development when printing by the laser. On the other hand, if the viscosity is more than 300 dPa·s, the fluidity and the wettability may be deteriorated, so that the coatability may be deteriorated. In addition, defects such as cracking and peeling may easily occur in the formed outer periphery-coated layer.

Such a coating material can be applied to at least a part of the outer peripheral surface of the honeycomb structure, and dried or dried and then fired to obtain the outer periphery-coated layer containing the ceramic powder (A), the ceramic powder (B) and the hollow particle.

(3. Outer Periphery-Coated Silicon Carbide-Based Honeycomb Structure)

The outer periphery-coated silicon carbide-based honeycomb structure according to the present invention includes the above silicon carbide-based honeycomb structure and an outer periphery-coated layer that covers the outer periphery of the silicon carbide-based honeycomb structure according to the present invention. Therefore, the outer periphery-coated layer contains from 20 to 75% by mass of ceramic powder (A) which contains from 55 to 95% by mass of silicon carbide and from 5 to 30% by mass of silicon dioxide as chemical components. When the grinding scraps or crushed wastes of the silicon carbide-based honeycomb structure are used as the ceramic powder (A), the ceramic powder (A) has the same composition as that of the silicon carbide-based honeycomb structure.

Further, another embodiment of the composition of the outer periphery-coated layer is the same as described above.

(4. Method for Coating Outer Periphery of Silicon Carbide-Based Honeycomb Structure)

Next, one embodiment of a method for coating the outer periphery of the silicon carbide-based honeycomb structure according to the present invention will be described. The method for coating the outer periphery of the silicon carbide-based honeycomb structure according to the present embodiment is a method including the steps of applying the coating material of the present invention onto the peripheral surface of a honeycomb structure having porous partition walls and having a plurality of cells defined by the partition walls, and drying the applied coating material to form the outer periphery-coated layer, as previously described.

First, the honeycomb structure having the porous partition walls and the plurality of cells defined by partition walls is produced. For example, when producing the honeycomb structure made of cordierite, raw material powder such as silicon carbide (SiC) powder is firstly blended, water is then added, mixed and kneaded to prepare a green body. In addition, to the green body may be optionally added a binder, a surfactant, a pore former and the like.

The resulting green body is then extruded using an extruder equipped with a die to obtain a honeycomb formed body, and the resulting honeycomb formed body is dried.

The dried honeycomb formed body is then fired at a predetermined temperature to produce a honeycomb structure having porous partition walls and having a plurality of cells defined by the partition walls. When producing an outer periphery-coated honeycomb structure in which plugged portions are disposed in opening portions of the cells, the plugging may be performed at a stage of producing the honeycomb formed body or the honeycomb structure.

For example, a method for plugging the opening portions of the cells to form the plugged portions is carried out by, first, applying masks onto opening portions of some cells at one end face of the honeycomb structure (or the honeycomb formed body), and immersing the end face in a storage container in which a plugging material is stored for forming plugged portions, and inserting the plugging material into cells that are not masked to form plugged portions. The plugging material for forming the plugged portions can be obtained by mixing a ceramic raw material, a surfactant, water, a sintering aid and the like, and optionally adding a pore former to increase porosity to form a slurry, and then kneading the slurry using a mixer or the like.

Masks are then applied onto opening portions of the cells that have not been masked at the one end face (cells other than the above some cells), on other end face of the honeycomb structure, and immersing its end face in the storage container in which the plugging material is stored, and inserting the plugging material into the cells that have not been masked, to form plugged portions.

Examples of the method for masking the opening portions of the cells include, but not limited to, a method for applying an adhesive film onto the entire end face of the honeycomb structure for a filter, and partially punching the adhesive film and the like. For example, a preferable example can include a method for applying an adhesive film onto the entire end face of the honeycomb structure for a filter, and then forming holes with laser at only portions corresponding to cells where the plugged portions are to be formed, and the like. The adhesive film that can be suitably used includes an adhesive film in which an adhesive is applied onto one surface of a film made of a resin such as polyester, polyethylene, and thermosetting resins, and the like.

Further, when the resulting honeycomb structure is produced in a state where the outer peripheral wall is formed on the outer peripheral surface of the honeycomb structure, the outer peripheral surface is preferably ground to remove the outer peripheral wall. The coating material is applied to the outer periphery of the honeycomb structure from which the outer peripheral wall has been thus removed, in a subsequent step, to form an outer periphery-coated layer. Further, when grinding the outer peripheral surface, a part of the outer peripheral wall may be ground and removed, and on that part, the outer periphery-coated layer may be formed by the coating material.

In addition to the production of the honeycomb structure as stated above, a coating material is prepared for forming the outer periphery-coated layer of the outer periphery-coated honeycomb structure. The coating material can be prepared by mixing at least ceramic powder (A) and a dispersion medium such that the ceramic powder (A) is a predetermined content ratio as previously described to form a slurry or a paste.

The ceramic powder (A) that can be suitable used may be powder composed of a material having the same composition as that of the ceramic material used as the material of the honeycomb structure as described above. For example, it is possible to employ grinding scraps or crushed wastes generated during the production of the honeycomb structure.

As the ceramic powder (B), for example, particles containing cordierite, alumina or the like can be used. The ceramic powder (B) is used in an amount of from 20 to 50% by mass. This can allow achievement of satisfactory color development by laser.

The coating material can be prepared by adding the dispersion medium to the ceramic powder and the above hollow particles as stated above, and mixing them. Examples of the dispersion medium that can be used include water. The dispersion medium is preferably used in an amount of from 15 to 30% by mass.

When preparing the coating material by mixing the above raw materials, the coating material can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer periphery-coated layer. Such a structure can allow effective suppression of the generation of cracks in the outer periphery-coated layer during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuring can allow application of the coating material with a uniform thickness. Further, this method can lead to a decreased surface roughness of the formed outer periphery-coated layer, and can allow the formation of an outer periphery-coated layer that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form an outer periphery-coated layer. On the other hand, when the outer peripheral wall is present on the outer peripheral surface of the honeycomb structure or a part of the outer peripheral wall is removed, the coating material may be partially applied to form the outer periphery-coated layer, or the coating material may be, of course, applied onto the entire outer peripheral surface of the honeycomb structure to form the outer periphery-coated layer.

The method for drying the applied coating material (i.e., the undried outer periphery-coated layer) is not limited, but in terms of preventing drying cracks, it can use, for example, a method for drying the coating material to 25% or more of a water content in the coating material by maintaining the coating material at room temperature for 24 hours or more, and then maintaining it in an electric furnace at 600° C. for 1 hour or more to remove moisture and organic matters.

Further, when the openings of the cells of the honeycomb structure are not sealed in advance, plugging may be performed in the openings of the cells after forming the outer periphery-coated layer.

Furthermore, the silicon carbide powder contained in the coating material develops color by irradiating the outer peripheral surface of the resulting outer periphery-coated honeycomb structure with laser. Therefore, product information or the like may be printed (marked) on the outer periphery-coated layer of the resulting outer periphery-coated honeycomb structure by irradiating it with laser light.

Preferred examples of laser light used for masking with laser include carbon dioxide gas ($CO_2$) laser, YAG laser and YVO4 laser. Conditions of the laser for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

When supporting the catalyst on the outer periphery-coated honeycomb structure, the printed portion is not deteriorated even after printing with the laser, and the printed portion can be read well even after supporting the catalyst. The method for supporting the catalyst is not particularly limited and can be carried out according to the method for supporting the catalyst carried out in the conventional method for producing the honeycomb structure.

Examples

Hereinafter, the present invention will be specifically described based on Examples, but the present invention is not limited to these Examples.

(Preparation of Honeycomb Structure)

To silicon-silicon carbide raw material powder mixed such that a composition after firing was silicon carbide:silicon:silicon dioxide=70:18:12 were added a forming aid, a pore former and water, and mixed and kneaded to prepare a green body. The resulting green body was extruded to form a rectangular parallelepiped unfired honeycomb formed body having a length of 42 mm, a width of 42 mm, and a height of 141 mm, and the honeycomb formed body was dried and fired to prepare a honeycomb segment.

Then, for 16 honeycomb segments, adhesive surfaces of PET masks (each having a thickness of 70 μm) were attached onto both of the entire end faces of each honeycomb segment. A paste-like joining material containing SiC powder and a binder was then applied onto the side surface of each honeycomb segment so as to have a thickness of 1 mm to form a coated layer. The other honeycomb segment was then disposed on the honeycomb segment such that the coated layer was in contact with the side surface. This step was then repeated to prepare a honeycomb segment laminated body comprised of a total of 16 honeycomb segments combined in a length of 4 pieces×a width of 4 pieces. Then, after applying a pressure from the outside, the laminated body was dried at 140° C. for 2 hours to obtain a honeycomb structure to which the honeycomb segments were joined. The masks were peeled off from each honeycomb segment.

In addition, the outer peripheral wall of the resulting honeycomb structure was removed by grinding its outer peripheral surface. The honeycomb structure (after removal of the outer peripheral wall) was a cylindrical shape having a diameter of 165 mm and a length of 141 mm, and having a porosity of 41% (low porosity honeycomb) and 63% (high porosity honeycomb), a thickness of partition wall of 0.30 mm, and a cell density of 46 cells/cm$^2$.

Each coating material having each composition as shown in Table 1 was prepared and applied onto the outer peripheral surface of each honeycomb structure produced by the above production of the honeycomb structure so as to have a thickness of 0.3 mm, and then dried using a hot air dryer at 120° C. for 60 minutes, and then heated in an electric furnace at 600° C. for 30 minutes to form an outer periphery-coated layer. During the drying and heating, the presence or absence of generated cracks and sink marks in the outer periphery-coated layer was evaluated as follows, and the results are shown in Table 1.

(Evaluation of Cracks/Sink Marks)

Evaluation of cracks and sink marks was performed by visually observing the entire outer periphery-coated surface of each honeycomb structure. For the cracks, a sample in which no crack was found was determined to be "Good", a sample in which only fine cracks each having a length of 5 mm or less were found was determined to be "Fair", and a sample in which cracks each having a length of more than 5 mm were found was determined to be "Poor". For the sink marks, a state where a substrate was exposed in a streaky or small hole shape in the coating material was defined as sink marks, and a sample in which no sink mark was found was determined to be "Good", a sample in which only fine sink marks of 5 mm or less were found was determined to be "Fair", and a sample in which sink marks of more than 5 mm were found was determined to be "Poor".

Further, the thermal expansion coefficients of the outer periphery-coated layer and the honeycomb structure were determined by measuring an average linear thermal expansion coefficient (thermal expansion coefficient) at a temperature of from 40 to 800° C. in the direction parallel to the flow path of the honeycomb structure, by a method in accordance with JIS R 1618. Each sample of the outer periphery-coated layers was prepared by cutting out a dried body of the coating material used for preparing the honeycomb structure, which was separately prepared and heated at 600° C. for 30 minutes, into a dimension of a height of 3 mm×a width of 3 mm×a length of 20 mm, and each sample of the honeycomb structures was cut out the honeycomb structure into a dimension of a height of 2 cells×a width of 2 cells×a length of 20 mm. The results are shown in Table 1.

Laser printing of a 2D barcode was performed on the outer peripheral surface of each outer periphery-coated honeycomb structure thus produced, under conditions of an output of 20 W and a scan speed of 500 mm/s, using a CO2 laser marker. Evaluation of thermal shock resistance and evaluation of contrast of printed portions (a printing barcode reading test) were carried out on the outer periphery-coated honeycomb structure in which laser printing was thus performed, as follows. The results are shown in Table 1.

(Evaluation of Thermal Shock Resistance)

The thermal shock resistance was evaluated by a rapid cooling test (an electric furnace spalling test). Each honeycomb structure was heated in an electric furnace at a predetermined starting temperature (350° C. or 400° C.) for 2 hours to render the entire temperature uniform, and then taken out from the electric furnace and rapidly cooled to room temperature. After the rapid cooling, the thermal shock resistance was evaluated depending on whether or not cracks were generated in the honeycomb structure. A case where no generated crack was observed at the starting temperature of 400° C. was determined to be "Good"; a case where generated cracks were observed at the starting temperature of 400° C., but no generated crack was observed at the starting temperature of 350° C. was determined to be "Fair"; and a case where generated cracks were observed at the starting temperature of 350° C. was determined to be "Poor".

(2D Code Reading Grade Evaluation)

The contrast between the printed portion colored by laser and the non-irradiated portion was evaluated by a reading test (a printing barcode reading test) using a barcode reader in accordance with ISO IEC 15415. The evaluation was conducted according to the following criteria. The "Reading Grade" in the following criteria is in accordance with the standard ISO/IEC 15415:

Reading grade A: good contrast, and satisfactorily readable for printed portions;

Reading Grades B to D: readable for printed portions; and

Reading Grade F: poor contrast between the printed portion and the non-irradiated portion, and difficulty to read.

TABLE 1-1

| | | | Example 1 | Example 2 | Example 3 | Example 4 | Example 5 | Example 6 | Example 7 | Example 8 |
|---|---|---|---|---|---|---|---|---|---|---|
| Prepared ratio (wt %) | Aggregate | Ceramic Powder (A) (SiC-Based): Silicon Carbide | 22.1 | 37.7 | 38.0 | 38.2 | 50.3 | — | 37.4 | 38.7 |
| | | Si-SiC Grinding Powder (Same Composition as Honeycomb Substrate) | — | — | — | — | — | 72.8 | — | — |
| | | Ceramic Powder (B) (White of Light Color): Cordierite | 22.1 | 6.9 | 15.0 | 20.1 | 8.9 | — | 14.7 | 15.3 |
| | | Alumina | 29.3 | 27.8 | 20.0 | 15.2 | 12.8 | — | 19.7 | 20.4 |
| | | Fiber: Aluminosilicate Fiber | — | — | — | — | — | — | — | — |
| | Adhesive | Colloidal Silica (Silica Solid Content of 40%) | 18.1 | 17.9 | 18.0 | 18.0 | 17.8 | 18.0 | 17.7 | 18.3 |
| | Organic Hollow Particles | Foaming Resin | 2.0 | 2.0 | 2.0 | 2.0 | 2.0 | 2.0 | 2.0 | 2.0 |
| | Organic Binder | CMC (Carboxymethyl Cellulose) | 0.1 | 0.1 | 0.1 | 0.1 | 0.1 | 0.1 | 0.1 | 0.1 |
| | Clay | Bentonite | 0.6 | 0.6 | 0.6 | 0.6 | 0.6 | 0.6 | 0.6 | 0.6 |
| | Dispersion Medium | Water | 5.7 | 7.0 | 6.3 | 5.8 | 7.5 | 6.5 | 7.8 | 4.6 |
| Particle Size Distribution of Aggregate | Ceramic Powder (SiC-Based) | Silicon Carbide D50 (μm) | — | — | — | — | — | — | — | — |
| | Si-SiC Grinding Powder (Same Composition as Honeycomb Substrate) | D10 (μm) | 2.8 | 3.3 | 2.8 | 2.6 | 2.8 | 3.5 | 1.7 | 3.9 |
| | | D50 (μm) | 18.8 | 21.4 | 18.8 | 15.7 | 18.8 | 14.9 | 8.9 | 28.9 |
| | | D90 (μm) | 51.9 | 53.5 | 51.9 | 39.8 | 51.9 | 57.7 | 21.4 | 72.1 |
| | Ceramic Powder (White of Light Color) | Cordierite D50 (μm) | 30.5 | 30.5 | 30.5 | 30.5 | 30.5 | — | 30.5 | 30.5 |
| | | Alumina D50 (μm) | 4.5 | 4.5 | 4.5 | 4.5 | 4.5 | — | 4.5 | 4.5 |
| Particle Size Distribution of Organic Hollow Particles | Organic Hollow Particles | Foaming Resin D50 (μm) | 44.0 | 44.0 | 44.0 | 44.0 | 44.0 | 44.0 | 44.0 | 44.0 |
| Outer Peripheral Coating Material Properties | | Thermal Expansion Coefficient (ppm/K) | 5.0 | 4.6 | 4.0 | 3.5 | 4.3 | 4.6 | 4.2 | 3.9 |
| | | Ratio of Thermal Expansion Coefficient to Honeycomb Substrate | 1.1 | 1.0 | 0.9 | 0.8 | 0.9 | 1.0 | 0.9 | 0.8 |
| Productivity | | Cracking in Drying/Heating Step | Good | Good | Good | Good | Fair | Good | Good | Fair |
| | | Sink Mark Generation in Drying/Heating Step | Fair | Fair | Good | Good | Good | Good | Fair | Good |
| Product Durability | | Thermal Shock Resistance Test (Low Porosity Honeycomb) | Fair | Good | Good | Good | Good | Good | Good | Good |
| | | Thermal Shock Resistance Test (High Porosity Honeycomb) | Good | Good | Good | Fair | Good | Fair | Good | Good |
| Laser Printability | | Strength of Laser Color Development | Weak | Strong | Strong | Strong | Strong | Strong | Strong | Strong |
| | | Laser Printing Contrast (Difference from Surroundings) | Moderate | High | High | Moderate | Low | Low | High | High |
| | | Laser Printing 2D Code Reading Grade (A > B > C > D: Passed; F: Failed) | D | A | A | B | C | F | A | A |

TABLE 1-2

| | | Comp. 1 | Comp. 2 | Comp. 3 | Comp. 4 | Comp. 5 | Comp. 6 | Comp. 7 |
|---|---|---|---|---|---|---|---|---|
| Prepared ratio (wt %) | Ceramic Powder (A) (SiC-Based): Silicon Carbide | 40.0 | — | — | — | — | — | — |
| | Si-SiC Grinding Powder (Same Composition as Honeycomb Substrate) | — | — | 33.0 | 17.0 | 77.0 | 36.7 | 39.0 |
| | Ceramic Powder (B) (White of Light Color): Cordierite | — | 60.0 | — | 24.0 | — | 14.4 | 15.3 |
| | Alumina | — | — | 33.0 | 32.0 | — | 19.3 | 20.5 |
| | Fiber: Aluminosilicate Fiber | 30.0 | — | — | — | — | — | — |
| | Adhesive: Colloidal Silica (Silica Solid Content of 40%) | 20.0 | 18.0 | 17.0 | 18.0 | 18.0 | 17.4 | 18.5 |
| | Organic Hollow Particles: Foaming Resin | 0.1 | 0.1 | 2.0 | 2.0 | 0.1 | 2.0 | 2.0 |
| | Organic Binder: CMC (Carboxymethyl Cellulose) | 0.6 | 0.6 | 0.1 | 0.1 | 0.1 | 0.1 | 0.1 |
| | Clay: Bentonite | 0.6 | 0.6 | 0.6 | 0.6 | 0.6 | 0.6 | 0.6 |
| | Dispersion Medium: Water | 9.3 | 21.3 | 14.3 | 6.3 | 4.3 | 9.5 | 4.0 |
| Particle Size Distribution of Aggregate | Ceramic Powder (SiC-Based): Silicon Carbide D50 (μm) | 3.5 | — | — | — | — | — | — |
| | Si-SiC Grinding Powder D10 (μm) | — | — | 2.8 | 2.8 | 2.8 | 0.8 | 4.8 |
| | Si-SiC Grinding Powder D50 (μm) | — | — | 18.8 | 18.8 | 18.8 | 7.0 | 33.5 |
| | Si-SiC Grinding Powder D90 (μm) | — | — | 51.9 | 51.9 | 51.9 | 18.6 | 77.0 |
| | Cordierite D50 (μm) | — | 23.8 | 30.5 | 30.5 | 30.5 | — | 30.5 |
| | Alumina D50 (μm) | — | — | 4.5 | 4.5 | 4.5 | — | 4.5 |
| | Foaming Resin D50 (μm) | — | — | 44.0 | 44.0 | — | 44.0 | 44.0 |
| Particle Size Distribution of Organic Hollow Particles | | — | — | — | — | — | — | — |
| Outer Peripheral Coating Material Properties | Thermal Expansion Coefficient (ppm/K) | 3.2 | 1.0 | 2.3 | 5.3 | 4.6 | 4.7 | 4.5 |
| | Ratio of Thermal Expansion Coefficient to Honeycomb Substrate | 0.7 | 0.2 | 0.5 | 1.2 | 1.0 | 1.0 | 1.0 |
| Productivity | Cracking in Drying/Heating Step | Good | Poor | Fair | Fair | Poor | Fair | Poor |
| | Sink Mark Generation in Drying/Heating Step | Poor | Fair | Poor | Poor | Fair | Poor | Fair |
| Product Durability | Thermal Shock Resistance Test (Low Porosity Honeycomb) | Fair | Poor | Fair | Poor | Good | Good | Good |
| | Thermal Shock Resistance Test (High Porosity Honeycomb) | Poor | Poor | Poor | Fair | Good | Fair | Fair |
| Laser Printability | Strength of Laser Color Development | Strong | Non | Strong | Weak | Strong | Strong | Strong |
| | Laser Printing Contrast (Difference from Surroundings) | High | Non | High | Low | Low | Low | Low |
| | Laser Printing 2D Code Reading Grade (A > B > C > D: Passed; F: Failed) | A | Test Failed | A | F | F | F | F |

DISCUSSION

It is understood from the results shown in Table 1 that in Inventive Examples, the cracks and sink marks are effectively suppressed and the thermal shock resistance is also improved as compared with Comparative Examples. In particular, it is understood that Examples using the coating material containing from 20 to 50% by mass of ceramic powder (B) also has an improved laser printing property.

DESCRIPTION OF REFERENCE NUMERALS 100 honeycomb structure
102 outer peripheral side wall
104 first end face
106 second end face
108 first cell
110 second cell
112 partition wall

What is claimed is:

1. A coating material for a silicon carbide-based honeycomb structure including a plurality of cells forming a flow path for a fluid, the coating material comprising from 20 to 75% by mass of ceramic powder (A), the ceramic powder (A) comprising from 55 to 95% by mass of silicon carbide and from 5 to 30% by mass of silicon dioxide as chemical components,
wherein the ceramic powder (A) has a D10 on a volume basis of from 1 to 4 μm, a D50 on a volume basis of from 8 to 30 μm, and a D90 of from 20 to 75 μm (D90>D50), based on a particle size distribution measurement by a laser diffraction/scattering method, and
wherein a ratio of a thermal expansion coefficient after drying the coating material at 600° C. for 30 minutes to a thermal expansion coefficient of the silicon carbide-based honeycomb structure is from 0.8 to 1.1, and
wherein the thermal expansion coefficients of the coating material and the silicon carbide-based honeycomb structure are determined by measuring average linear thermal expansion coefficient at a temperature of from 40 to 80° C. in a direction parallel to the flow Path of the silicon carbide-based honeycomb structure.

2. The coating material according to claim 1, wherein the ceramic powder (A) is grinding scrap or crushed powder of the silicon carbide-based honeycomb structure.

3. The coating material according to claim 1, further comprising from 20 to 50% by mass of white or light colored ceramic powder (B).

4. The coating material according to claim 3, wherein the ceramic powder (B) comprises at least one selected from the group consisting of cordierite, silicon nitride, alumina, mullite, zirconia, zirconium phosphate, titania and aluminum titanate.

5. The coating material according to claim 3, wherein the ceramic powder (B) has a D50 on volume basis of from 1 to 40 μm, based on a particle size distribution measurement by a laser diffraction/scattering method.

6. The coating material according to claim 1, wherein the coating material further comprises from 0.1 to 4% of hollow particles containing an organic substance, and wherein the hollow particles have a D50 on volume basis of from 35 to 55 μm, based on a particle size distribution measurement by a laser diffraction/scattering method.

7. A method for coating an outer periphery of a silicon carbide-based honeycomb structure, the method comprising:
applying the coating material according to claim 1 onto an outer periphery of the silicon carbide-based honeycomb structure and drying the applied coating material to form an outer peripheral coated layer.

8. An outer periphery-coated silicon carbide-based honeycomb structure, comprising: a silicon carbide-based honeycomb structure including a plurality of cells forming a flow path for a fluid; and an outer periphery-coated layer covering an outer periphery of the silicon carbide-based honeycomb structure,
wherein the outer periphery-coated layer comprises from 20 to 75% by mass of ceramic powder (A), the ceramic powder (A) comprising from 55 to 95% by mass of silicon carbide and from 5 to 30% by mass of silicon dioxide as chemical components, and
wherein the ceramic powder (A) has a D10 on a volume basis of from 1 to 4 μm, a D50 on a volume basis of from 8 to 30 μm, and a D90 of from 20 to 75 μm (D90>D50), based on a particle size distribution measurement by a laser diffraction/scattering method, and
wherein a ratio of a thermal expansion coefficient of the outer periphery-coated layer to a thermal expansion coefficient of the silicon carbide-based honeycomb structure is from 0.8 to 1.1, and
wherein the thermal expansion coefficients of the outer periphery-coated layer and the silicon carbide-based honeycomb structure are determined by measuring average linear thermal expansion coefficient at a temperature of from 40 to 800° C. in a direction parallel to the flow path of the silicon carbide-based honeycomb structure.

9. The outer periphery-coated silicon carbide-based honeycomb structure according to claim 8, wherein the ceramic powder (A) has the same composition as that of the silicon carbide-based honeycomb structure.

* * * * *